United States Patent [19]

O'Brien

[11] Patent Number: 4,578,869
[45] Date of Patent: Apr. 1, 1986

[54] DIE CASTING MACHINE ALIGNMENT TOOL

[76] Inventor: John W. O'Brien, 607 S. Kelly St., Harrison, Ark. 72601

[21] Appl. No.: 664,213

[22] Filed: Oct. 24, 1984

[51] Int. Cl.$^4$ .............................................. G01B 5/25
[52] U.S. Cl. .................... 33/181 R; 33/550; 33/533
[58] Field of Search .......... 33/180 R, 180 AT, 181 R, 33/181 AT, 412, 550, 533, 543

[56] References Cited

U.S. PATENT DOCUMENTS

| | | | |
|---|---|---|---|
| 1,840,671 | 1/1932 | Holton | 33/180 A X |
| 2,541,318 | 2/1951 | Woodward | 33/180 AT |
| 2,656,607 | 10/1953 | Harding | 33/180 R |
| 4,222,173 | 9/1980 | Hall | 33/550 X |

FOREIGN PATENT DOCUMENTS 972407 8/1950 France ................ 33/181 R

Primary Examiner—Harry N. Haroian
Attorney, Agent, or Firm—Kokjer, Kircher, Bradley, Wharton, Bowman & Johnson

[57] ABSTRACT

For a die casting machine 10, an alignment tool having a tubular connecting sleeve 19 inserted in the shot sleeve 18 of the die casting machine 10 and concentrically aligned with the shot sleeve 18 by tapered cones 20 and 22 engaging the ends of the shot sleeve 18. A rotatable shaft 25 is disposed within the connecting sleeve 19 and carries one or more brackets 28 on its outer ends. Mounted on the bracket 28 is a dial indicator 33 having a work piece engaging spindle point 33a to bear on alternative surfaces of the die casting machine such as the die 17 or outside diameter of the shot sleeve 18 to detect and visually indicate any misalignment of the shot sleeve 18, die 17 and front platen 16 when the rotatable shaft 25 is rotated within the connecting sleeve 19. An auxiliary bracket 34 mounted on the bracket 28 carries an extension rod 35 having spaced apart dial indicators 38 and 39 with spindle points 38a and 39a bearing on the shot cylinder rod 15 to detect bends therein, a worn cylinder rod bearing, and axial and angular misalignment of the shot cylinder 13 and shot sleeve 18.

9 Claims, 5 Drawing Figures

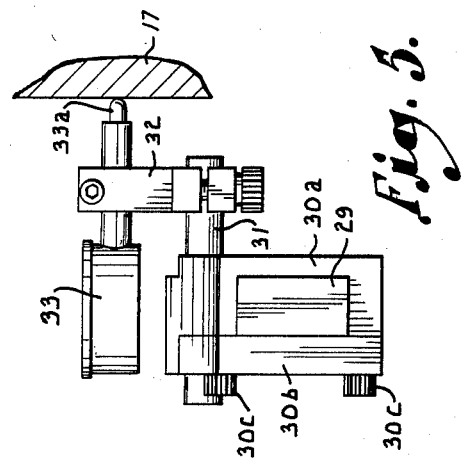
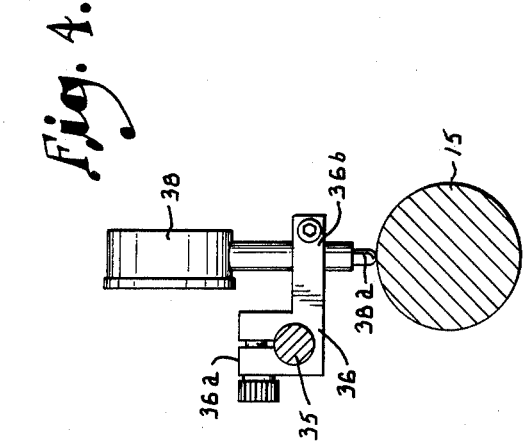
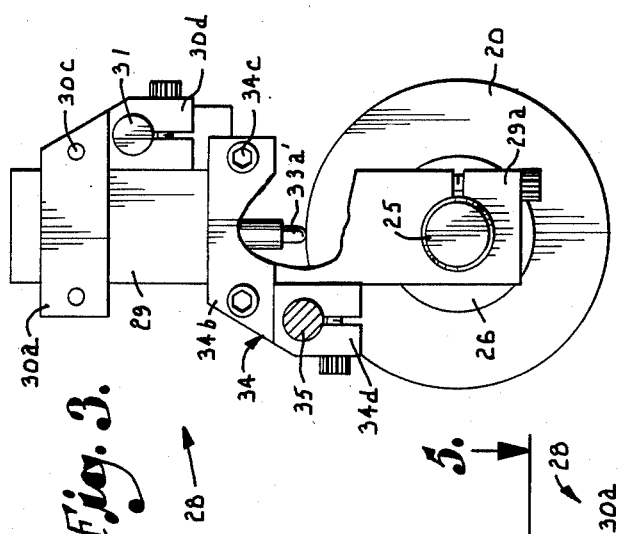
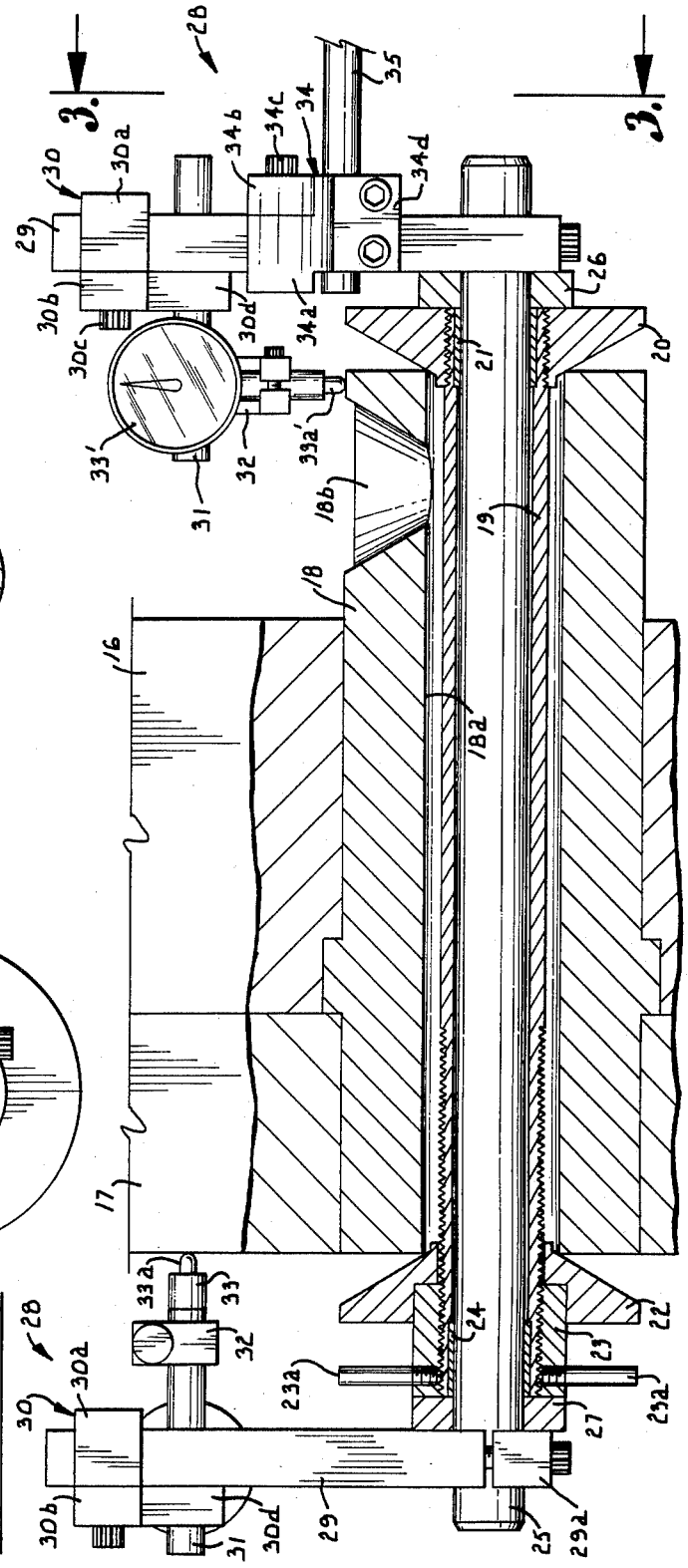

DIE CASTING MACHINE ALIGNMENT TOOL

BACKGROUND AND SUMMARY OF THE INVENTION

This invention relates to a tool for determining axial and angular alignment between a bore and a rod which moves through the bore. More specifically, the invention relates to an alignment tool for a die casting machine to check the axial and angular alignment of the shot sleeve, shot cylinder and shot cylinder rod of the die casting machine.

In the die casting process, molten metal is poured through a side hole into a hollow sleeve called the shot sleeve of the die casting machine. One end of the shot sleeve is connected to a die and the opposite end receives a tight-fitting piston called a plunger for forcing the molten metal into the die. The plunger is connected and actuated by a cylinder rod from a hydraulic cylinder known as the shot cylinder of the die casting machine. The shot sleeve, shot cylinder and shot cylinder rod must be in perfect alignment or the plunger will wear excessively on one side, causing molten metal to leak around it and spray into the surrounding area. Misalignment also wears the shot cylinder rod bearing and the piston within the shot cylinder.

Misalignment can consist of axial misalignment characterized by the longitudinal centerline of the shot sleeve offset from the longitudinal centerline of the hydraulic shot cylinder. In other words, when axial misalignment exists, the axis of the shot sleeve is parallel to the axis of the shot cylinder but the two axes are offset from one another. Misalignment can also consist of angular misalignment characterized by a non-zero angle between the centerline of the shot sleeve and the centerline of the shot cylinder. In other words, when angular misalignment exists, the longitudinal axis of the shot sleeve is not parallel with the longitudinal axis of the shot cylinder. Both types of misalignment, separately or in combination, exist in die casting machines.

Numerous causes for misalignment are known. These include (a) a warped front platen in which the shot sleeve is mounted; (b) an oversized or distorted mounting hole in the front platen for the shot sleeve; (c) the bore in the shot sleeve non-concentric with the outside diameter of the shot sleeve; (d) a warped shot sleeve; (e) a bent shot cylinder rod; (f) a worn cylinder rod bearing; or (g) a distorted die casting machine bed. As with most high precision equipment, repair and replacement of parts is extremely costly.

In order to keep wear to a minimum, proper alignment of the equipment is of great importance and should be regularly checked. Unfortunately, there has been no inexpensive and easily used method of checking alignment. As a result, misalignment in the die casting machine typically goes undetected and uncorrected until it becomes excessive. There remains a need in the industry for a die casting machine alignment tool which can be used regularly, easily and inexpensively to detect axial and angular misalignment of the shot sleeve, shot cylinder and cylinder rod. The primary goal of this invention is to fulfill this need in the industry.

More specifically, an object of the invention is to provide a reliable instrument to measure both axial and angular misalignment and to identify where corrections or adjustments of the die casting machine should be made.

Another object of the invention is to provide an alignment tool of the character described which is economical and can thus be practically used on a regular basis to detect misalignment at an early stage so that adjustments can be made before major repair is required.

An additional object of the invention is to provide an alignment tool of the character described which can be readily understood and utilized by those skilled in the die casting industry.

Other and further objects of the invention, together with the features of novelty appurtenant thereto, will appear in the description of the drawings.

In summary, the die casting machine alignment tool comprises a tubular connecting sleeve inserted in the shot sleeve and concentrically aligned therewith by tapered cones engaging the ends of the shot sleeve. A rotatable shaft is disposed within the connecting sleeve and carries one or more brackets on the outer ends. Mounted on the bracket is a dial indicator having a work piece engaging spindle to bear on alternative surfaces of the die casting machine such as the die, outside diameter of the shot sleeve, or the cylinder rod to detect and visually indicate any misalignment when the rotatable shaft is rotated within the connecting sleeve.

DESCRIPTION OF THE DRAWINGS

In the following description of the drawings, in which like reference numerals are employed to indicate like parts in the various views:

FIG. 2 is an enlarged sectional view of the shot sleeve portion of the die casting machine with the test equipment installed to check for misalignment;

FIG. 3 is an end elevational view taken along line 3—3 of FIG. 2 in the direction of the arrows;

FIG. 4 is a sectional, elevational view taken along line 4—4 of FIG. 1 in the direction of the arrows;

FIG. 5 is a top plan view taken along line 5—5 of FIG. 2 in the direction of the arrows.

Referring to FIG. 1 in greater detail, portions of a conventional die casting machine 10 are illustrated. The machine 10 includes a machine bed 11 to provide a solid structural base for the equipment. Projecting upwardly from the machine bed 11 is a cylinder support 12 on which is mounted the hydraulic shot cylinder 13. Interiorly of the shot cylinder 13 is a piston 14 to which is connected the cylinder rod 15 that projects outwardly through a cylinder rod bearing (not shown) from the inner end of the shot cylinder 13. Those skilled in the art will understand that a plunger is normally connected to the outer end of the cylinder rod 15 to force molten metal through the shot sleeve 18. The plunger and its connecting collar have been omitted from the drawings, however, for the purpose of clarity.

Figure 1:
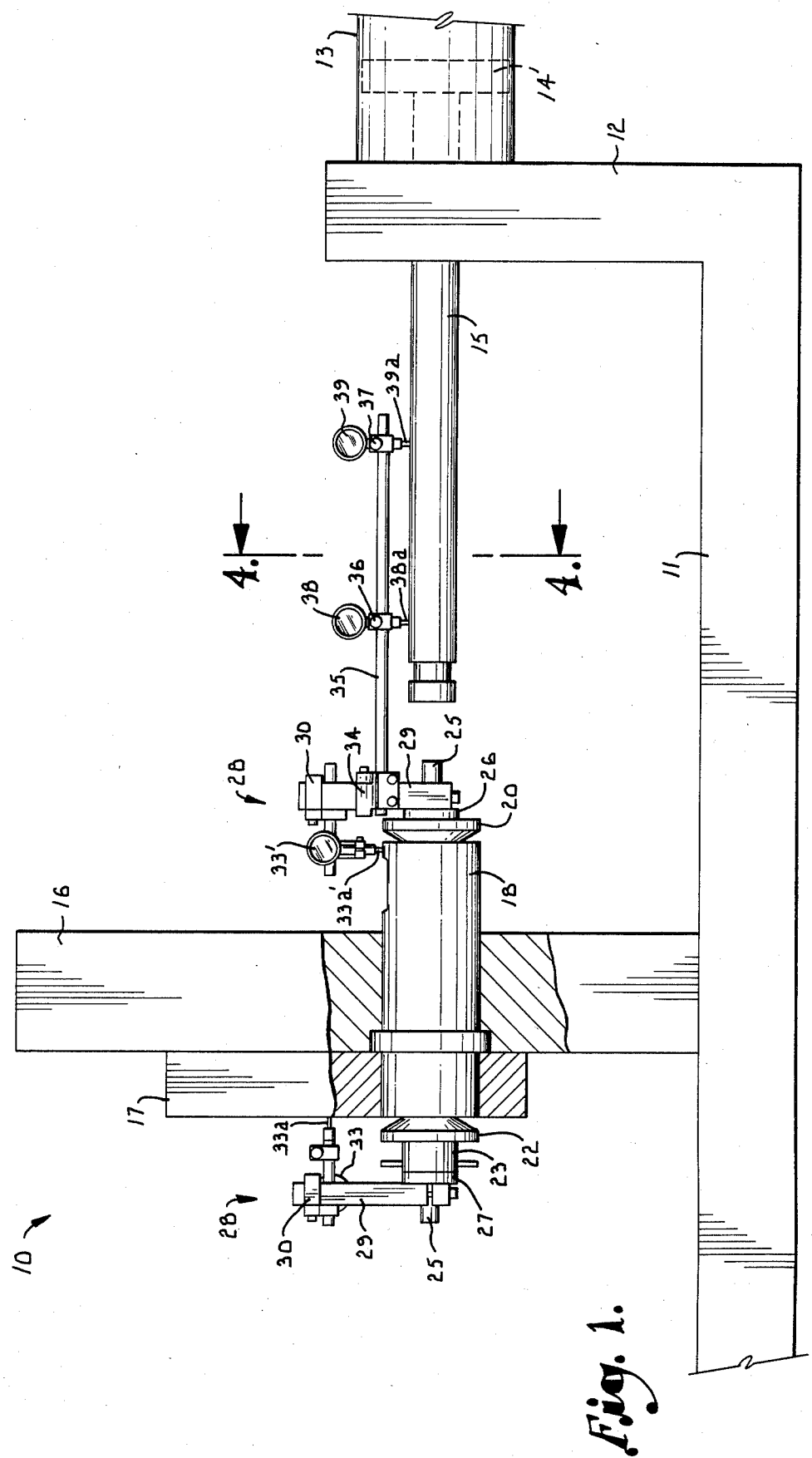
FIG. 1 is a side elevational view of portions of a conventional die casting machine having the alignment tool constructed in accordance with a preferred embodiment of the invention shown installed to check for misalignment of various features of the machine.

Spaced apart from the cylinder support 12 and securely fixed to the machine bed 11 is an upstanding front platen 16 on which is mounted the stationary portion of a die 17 into which will be forced molten metal during the die casting process. Disposed through the front platen 16 and communicating with the die 17 is a shot sleeve 18. The shot sleeve 18 has a longitudinal bore 18a therethrough. A funnel-shaped pour hole 18b is disposed in the upper surface of the shot sleeve 18 at its outer end to provide interior access to the bore 18a.

During the die casting process, therefore, molten metal is delivered to the bore 18a of the shot sleeve 18 through the pour hole 18b and the hydraulic shot cylinder 13 is operated to extend the cylinder rod 15 which carries the plunger. The plunger travels through the shot sleeve 18 as the cylinder rod 15 is extended to force the molten metal into the die 17.

Turning attention to the alignment tool of this invention reference is directed first to FIG. 2. A tubular connecting sleeve 19 is disposed within the shot sleeve 18. Each end of the connecting sleeve 19 is threaded and projects outwardly from the end of the shot sleeve 18. On the right end of the connecting sleeve 19 as viewed in FIG. 2 is threaded a tapered cone 20 with the tapered surface thereof engaging the end of the bore 18a of the shot sleeve 18. Pressed into the right end of the bore of the connecting sleeve 19 is a journal bearing 21. Slipped over the opposite end (i.e., the left end as viewed in FIG. 2) of the connecting sleeve 19 is a tapered cone 22 with the tapered surface thereof engaging the end of the bore 18a of the shot sleeve 18. A threaded adjustment collar 23 having hand tightening pins 23a is threaded onto the left end of the connecting sleeve 19. Tightening the adjustment collar 23 thus causes the tapered cones 20 and 22 to concentrically center the connecting sleeve 19 within the bore 18a of the shot sleeve 18. Pressed into the left end of the bore of the connecting sleeve 19 is a journal bearing 24.

Received within said connecting sleeve 19 and supported by the journal bearings 21 and 24 at the opposite ends of the connecting sleeve 19 is a rotatable shaft 25. The shaft 25 is of sufficient length to extend outwardly from both ends of connecting sleeve 19. On each end of the shaft 25 are thrust bearings 26 and 27 which respectively engage the right tapered cone 20 and the adjustment collar 23. Outwardly adjacent each thrust bearing 26 and 27, a bracket assembly 28 is mounted on the rotatable shaft 25.

Although the bracket assemblies 28 are similarly constructed, the one on the left end of the shaft 25 as shown in FIGS. 2 and 5 will first be described in detail. An arm 29 is fabricated from rectangular bar stock and has a hole near one end thereof substantially the same diameter as the rotatable shaft 25. The hole is split and the spaced apart portions of the arm 29 are drilled and tapped to receive a tightening bolt and thereby forms a split clamp type of construction, designated generally by the numeral 29a. The arm 29 is installed on the rotatable shaft 25 and secured at a right angle thereto by tightening the bolt associated with the split clamp 29a.

Removably secured to the outer end of the arm 29 is an attachment bracket 30 which includes a U-shaped portion 30a engaging the arm 29 and a clamping plate 30b with bolt members 30c for biasing the attachment bracket 30 to the arm 29. A portion of the attachment bracket 30 forms a split clamp 30d which carries an offset rod 31 directed toward the stationary die 17 of the die casting machine 10. Mounted on the end of the offset rod 31 by a split clamp is a holding bracket 32 adapted to carry a conventional dial indicator 33.

Dial indicators are known to skilled machinists and mechanics. Basically, such devices include an indicator body, a tubular base projecting from the body, a dial face with a dimension scale on it, a movable indicator needle, and a spring loaded spindle point which projects from the tubular base for engaging a work piece. When the spindle point is depressed, the indicator needle will be caused to rotate over the dial face to measure the distance that the spindle point has been depressed.

A split clamp on the outer end of the holding bracket 32, therefore, adjustably holds the tubular base of the dial indicator 33 so that the spindle point 33a bears on the surface of the die 17.

A bracket assembly 28 of the same construction as that just described and indicated by the same reference numerals is installed on the right end of the rotatable shaft 25. A second dial indicator 33' is carried by the holding bracket 32 so that the spindle point 33a' bears on the outside diameter of the shot sleeve 18.

Removably installed on the arm 29 intermediate the upper attachment bracket 30 and the shaft 25 is a second attachment bracket 34 as shown in FIGS. 2 and 3. The attachment bracket 34 includes a U-shaped portion 34a engaging the arm 29 and a clamping plate 34b with bolt members 34c for biasing the attachment bracket to the arm 29. A portion of the attachment bracket 34 forms a split clamp 34d which carries an elongate extension rod 35. The extension rod 35 is substantially parallel with the cylinder rod 15 of the die casting machine 10, but offset from the cylinder rod 15 (see FIG. 1).

A pair of indicator holding brackets 36 and 37 are mounted on on the extension rod 35 in a spaced apart relationship. Each holding bracket 36 and 37 has a split clamp on each end. As best illustrated in FIG. 4, split clamp 36a mounts the bracket 36 to the extension rod 35 and the other split clamp 36b carries a dial indicator 38 so that its spindle point 38a bears on the outside diameter of the cylinder rod 15. Similarly, bracket 37 mounts to the extension rod 35 to carry dial indicator 39 so that its spindle point 39a bears on the outside diameter of the cylinder rod 15.

In operation, the alignment tool constructed in accordance with the foregoing principles can perform a wide variety of tests on the die casting machine 10. A typical testing procedure follows.

The alignment tool may be properly installed in accordance with the prior description basically as illustrated in FIG. 2, except that the auxiliary attachment bracket 34 and extension rod 35 will be removed for performing the first example test. The dial indicator 33 having the spindle point engaging the die 17 is to be first observed. As the rotatable shaft 25 is turned, the spindle point 33a of the dial indicator 33 traces a circle on the die 17 face. The bracket assembly 28 is pressed against the thrust bearing 27 to prevent end play (i.e., longitudinal movement) in the shaft 25. During this rotation of the shaft 25, the needle of the dial indicator 33 is observed. If the reading does not change appreciably (i.e., usually not more than 0.005") over the full rotation, alignment of the die 17, front platen 16 and shot sleeve 18 can be judged to be correct. If, however, significant deviation in the reading is noted (i.e., over 0.005"), then alignment is not proper and various causes for misalignment must be further investigated. These problems include the weight of the die 17 resting on the shot sleeve 18, the die 17 face not parallel with the front platen 16, a warped die 17 or front platen 16, a shot sleeve bore 18a worn on the edges, a warped shot sleeve 18, or a shot sleeve 18 with a bore 18a which is not concentric with its outside diameter.

Next to be observed is the dial indicator 33' with its spindle point 33a' bearing on the outside diameter of the shot sleeve 18. Again, the shaft 25 is rotated and the needle of the dial indicator 33' is observed during such rotation as the spindle point 33a' traces circumference of the shot sleeve 18. Deviation in the reading indicates that the bore 18a of the shot sleeve 18 is not concentric with the longitudinal axis of the shot sleeve 18.

It should be noted that dial indicator 33' and bracket assembly 28 on the right end of shaft 25 as seen in FIG. 2 are for convenience. The same test can be performed without using a second bracket assembly 28 and dial indicator 33' by remounting the first mentioned bracket assembly 28 and dial indicator 33 from the left end of the shaft 25 to the right end of the shaft 25 and proceeding as above with the dial indicator 33 adjusted and positioned to bear on the outside circumference of the shot sleeve 18.

If the foregoing tests indicate that the shot sleeve 18 is square with the die 17 and front platen 16, further testing can be performed. The auxiliary bracket 34 and extension rod 35 are mounted on the arm 29 and the spindle points 38a and 39a of the two spaced dial indicators 38 and 39 are positioned to bear on the cylinder rod 15. Typically, the dial indicators 38 and 39 can be spaced apart approximately 10 inches or more. the cylinder rod 15 itself can then be rotated while the dial indicators 38 and 39 remain stationary. Variations in the readings of the two dial indicators 38 and 39 indicate a bent cylinder rod 15. The dial indicators 38 and 39 may be moved to different spacings and to different longitudinal positions along the cylinder rod 15 and the rotational of the cylinder rod 15 repeated to locate regions of maximum deviation in the readings.

To test for cylinder bearing wear, the two dial indicators 38 and 39 are positioned at the top of the cylinder rod 15. The technician then attempts to move the end of the cylinder rod 15 alternately toward and then away from the dial indicators 38 and 39. Significant deflection indicates that the cylinder rod bearing is worn. The test may be repeated with the dial indicators 38 and 39 moved to different positions to detect the location of greatest wear.

If the foregoing testing reveals that the cylinder rod 15 is not bent and the cylinder rod bearing is not worn, then variations of the readings of the dial indicators 38 and 39 as they are rotated around the partially extended cylinder rod 15 give a true indication of any misalignment existing between the shot sleeve 18 and the shot cylinder 13. Typically, the dial indicators 38 and 39 can be spaced apart approximately 10 inches or more. Rotating the shaft 25 causes the spindle points 38a and 39a to trace two, spaced apart circles around the circumference of the cylinder rod 15. Alternatively, if obstructions are present around the die casting machine 10, rotating the shaft 25 through an arc as little as 45 degrees will give sufficient changes in readings to detect when the cylinder rod 15 is aligned or misaligned. Adjustments and corrections can then be made to reduce these variations until dial indicator 38 and 39 readings reach a minimum, thus aligning the shot sleeve 18 and the shot cylinder 13. It should be noted that using one dial indicator 38 or 39 rotating around the shot cylinder rod 15 which produces no variation in reading indicates only that the axis of the shot sleeve 18 and shot cylinder 13 coincide at that one point. Adjusting the alignment until both dial indicators 38 and 39 produce no variations in readings when rotated around the shot cylinder rod 15 indicate that the centerlines of the shot sleeve 18 and shot cylinder 13 coincide at both dial indicator 38 and 39 positions. This can only happen when the two centerlines exactly coincide and both angular and axial misalignment have been corrected.

The foregoing notwithstanding, it should be noted that dial indicators 38 and 39 are provided for convenience. The same test can be performed using a single dial indicator with its spindle point bearing on the cylinder rod 15. However, if a single dial indicator is used, then readings must be taken at least at two different locations along the cylinder rod 15 so that the net effect will be the same as if two dial indicators (e.g., indicators 38 and 39) had been utilized. In other words, the objective would be to adjust the alignment until there was no variations in the readings at two different locations along the cylinder rod 15 which would therefore indicate that the shot sleeve 18 and cylinder 13 were in alignment.

From the foregoing it will be seen that this invention is one well adapted to attain all the ends and objects hereinabove set forth, together with the other advantages which are obvious and which are inherent to the structure.

It will be understood that certain features and subcombinations are of utility and may be employed without reference to other features and subcombinations. This is contemplated by and within the scope of the claims.

Since many possible embodiments may be made of the invention without departing from the scope thereof, it is understood that all matter herein set forth or shown in the accompanying drawings is to be interpreted as illustrative and not in a limiting sense.

Having thus described my invention, I claim:

1. An alignment tool for a die casting machine having a shot sleeve, a shot cylinder and a cylinder rod, said alignment tool comprising:
   (a) a tubular connecting sleeve disposed within said shot sleeve;
   (b) means for holding said connecting sleeve concentrically centered with respect to said shot sleeve;
   (c) a rotatable shaft received within said connecting sleeve with opposite end portions projecting outwardly from said connecting sleeve;
   (d) a bracket member mounted on one end of said rotatable shaft; and
   (e) a dial indicator mounted on said bracket and having a work piece engaging spindle point;
   whereby said spindle point of said dial indicator may be caused to bear on alternative surfaces of said die casting machine to measure the axial and angular alignment of said shot sleeve, shot cylinder and cylinder rod when said rotatable shaft is rotated within said connecting sleeve.

2. The alignment tool as in claim 1, said tubular connecting sleeve having threaded opposite ends, having a smaller outside diameter that the bore of said shot sleeve to be received therein, and having greater length than said shot sleeve to enable said threaded opposite ends to project from said shot sleeve.

3. The alignment tool as in claim 1, said holding means comprising a pair of tapered cone members to grip the outer ends of said connecting sleeve and to engage the ends of said shot sleeve to hold said connecting sleeve concentrically centered within said shot sleeve.

4. The alignment tool as in claim 3 including a thrust bearing member received on said rotatable shaft intermediate said bracket member and one of said cone members.

5. The alignment tool as in claim 1, said die casting machine includes a die and a front platen for mounting said die, wherein said spindle point engages said die and traces a circle on said die when said rotatable shaft is rotated within said connecting sleeve to detect misalignment of said shot sleeve with said die and front platen.

6. The alignment tool as in claim 1, wherein said spindle point engages said shot sleeve and traces a circle on the circumference of said shot sleeve when said rotatable shaft is rotated within said connecting sleeve to measure alignment of the bore of said shot sleeve.

7. The alignment tool as in claim 1 further including an extension rod mounted on said bracket member and a pair of dial indicators, each having a work piece engaging spindle point, mounted spaced apart on said extension rod with the spindles points thereof engaging said cylinder rod to detect and visually indicate axial and angular misalignment of said cylinder rod when said rotatable shaft is rotated within said connecting sleeve.

8. The alignment tool as in claim 1, said die casting machine includes a die and a front platen for mounting said die, and said tool further includes a pair of bracket members, one bracket member mounted on each end of said rotatable shaft, and a pair of dial indicators, one mounted on each said bracket members, each dial indicator having a work piece engaging spindle point wherein one said spindle point engages said die and traces a circle on said die when said rotatable shaft is rotated within said connecting sleeve to detect misalignment of said shot sleeve with said die and front platen and wherein said second spindle point engages said shot sleeve and traces a circle on the circumference of said shot sleeve when said rotatable shaft is rotated within said connecting sleeve to measure alignment of the bore of said shot sleeve.

9. The alignment tool as in claim 1 including a pair of journal bearings within said connecting sleeve to rotatably receive said shaft and to concentrically center said shaft within said connecting sleeve.

* * * * *